US010259654B2

United States Patent
Balk et al.

(10) Patent No.: US 10,259,654 B2
(45) Date of Patent: Apr. 16, 2019

(54) CONVEYOR AND A CONVEYING SYSTEM (71) Applicant: Ambaflex International B.V., Zwaag (NL)

(72) Inventors: Wouter Balk, Baambrugge (NL); Johannes Wilhelmus Broers, Oosterblokker (NL)

(73) Assignee: AMBAFLEX INTERNATIONAL B.V., Zwaag (NL)

( * ) Notice: Subject to any disclaimer, the term of this patent is extended or adjusted under 35 U.S.C. 154(b) by 0 days.

(21) Appl. No.: 15/480,048

(22) Filed: Apr. 5, 2017

(65) Prior Publication Data

US 2017/0291770 A1    Oct. 12, 2017

(30) Foreign Application Priority Data

Apr. 8, 2016   (EP) .................................... 16164444

(51) Int. Cl.
*B65G 21/18* (2006.01)
*B65G 37/00* (2006.01)
(52) U.S. Cl.
CPC ............. *B65G 21/18* (2013.01); *B65G 37/00* (2013.01); *B65G 2207/24* (2013.01)
(58) Field of Classification Search
CPC ..................................................... B65G 21/18
(Continued)

(56) References Cited

U.S. PATENT DOCUMENTS 4,269,302 A    5/1981   Garvey
4,934,517 A *  6/1990   Lapeyre ............... B65G 17/086
                                                  198/831

(Continued)

FOREIGN PATENT DOCUMENTS

DE    3726059 C1    12/1988
EP    0369648 A1    5/1990
(Continued)

OTHER PUBLICATIONS

European Search Report and Written Opinion for European patent application No. 161644443.8, dated Oct. 19, 2016.

(Continued)

*Primary Examiner* — Gene O Crawford
*Assistant Examiner* — Lester Ill Rushin
(74) *Attorney, Agent, or Firm* — Steven M. Koehler; Westman, Champlin & Koehler, P.A.

(57) ABSTRACT

A helical conveyor comprises a belt having a transport section for transporting products where the belt follows at least partly a helical path between a lower end and an upper end of the transport section and a return section where the belt follows a path. The conveyor comprises a lower end reverse guide for turning the belt upside down and reversing its direction of movement between the transport section and the return section at the lower end of the transport section and an upper end reverse guide for turning the belt upside down and reverting its direction of movement between the transport section and the return section at the upper end of the transport section. The return section leaves the upper end through a horizontally oriented upper return section portion and the return section leaves the lower end through a horizontally oriented lower return section portion.

14 Claims, 6 Drawing Sheets

(58) Field of Classification Search
USPC .......... 198/778, 844.1; 193/35 S, 469.1, 606
See application file for complete search history.

(56) References Cited

U.S. PATENT DOCUMENTS

| | | | |
|---|---|---|---|
| 6,062,375 A * | 5/2000 | Pupp | B65G 21/18 |
| | | | 198/778 |
| 8,162,132 B2 | 4/2012 | Muller | |
| 8,302,764 B2 * | 11/2012 | Johnson | B65G 21/18 |
| | | | 198/778 |
| 8,348,048 B2 | 1/2013 | De Angelis et al. | |
| 8,522,960 B2 | 9/2013 | Johnson | |
| 9,139,371 B2 * | 9/2015 | De Angelis | B65G 21/18 |
| 2010/0263993 A1 | 10/2010 | De Angelis et al. | |
| 2010/0294626 A1 | 11/2010 | Muller | |
| 2011/0174596 A1 | 7/2011 | Johnson | |
| 2013/0153369 A1 | 6/2013 | De Angelis | |

FOREIGN PATENT DOCUMENTS

| | | |
|---|---|---|
| EP | 1340698 A1 | 9/2003 |
| JP | S52155779 A | 12/1977 |
| JP | H07157058 A | 6/1995 |
| JP | H08208015 A | 8/1996 |
| JP | 2001301940 A | 10/2001 |
| WO | 2009036580 A1 | 3/2009 |
| WO | 2010047867 A1 | 4/2010 |
| WO | 2011156927 A1 | 12/2011 |

OTHER PUBLICATIONS

European Office Action, dated Jul. 25, 2018 for corresponding European Patent Application No. 16164444.8, filed Apr. 8, 2016.

* cited by examiner

CONVEYOR AND A CONVEYING SYSTEM

BACKGROUND

This discussion below is merely provided for general background information and is not intended to be used as an aid in determining the scope of the claimed subject matter.

Aspects of the invention relate to a helical conveyor, comprising a drivable endless conveyor belt having a transport section for transporting products where the conveyor belt follows at least partly a helical path between a lower end and an upper end of the transport section and a return section where the conveyor belt follows a path between the lower end and the upper end outside the transport section, a lower end reverse guide for turning the conveyor belt upside down and reverting its direction of movement between the transport section and the return section at the lower end of the transport section and an upper end reverse guide for turning the conveyor belt upside down and reverting its direction of movement between the transport section and the return section at the upper end of the transport section, wherein the return section leaves the upper end through a horizontally oriented upper return section portion and the return section leaves the lower end through a horizontally oriented lower return section portion.

Helical conveyors are widely known in the prior art. In general a helical conveyor has an endless conveyor belt which follows a helical transport path for transporting products in vertical direction from an input at the lower end to an output at the upper end of the helical path and a return path along which the conveyor belt moves back from the output to the input. Hence, products may be supplied to the conveyor belt at the input and removed from the conveyor belt at the output, whereas the unloaded belt moves back from the output to the input.

A typical known helical conveyor has its output at a higher level than its input. At the output the conveyor belt leaves the helical path and follows a straight horizontal path before it bends downwardly by an angle of 90° outside the helical path, as seen from above. After arriving at a height level near the input the conveyor belt bends again by an angle of 90° and follows a straight horizontal path extending parallel to and below the horizontal path at the output. Subsequently, the conveyor belt bends upwardly via a reverse roller and reverts at the input in order to follow the helical path from the input to the output. This means that the conveyor belt outside the helical path follows a short track, whereas the bends of the conveyor belt about an axis extending perpendicularly to its conveying direction and parallel to the plane of the conveyor belt, are always directed in the same direction, i.e. the conveyor belt is always bent about its lower side, hence in a direction from the upper belt side to the lower belt side about an axis extending transversely to the conveying direction. This may be advantageous for certain conveyor belts which have a smaller minimum bending radius about their lower side than about their upper side, such that small-radius bends can be applied.

A drawback of the latter conveyor is the presence of a straight portion of the conveyor belt downstream of the output at the upper end of the helical path. For example, if it is desired to stack two helical conveyors onto each other and to connect the output of one of them to the input of the other one, the upper conveyor must have a horizontal displacement with respect to the lower conveyor due to the straight portion downstream the upper end of the helical path of the lower conveyor. Furthermore, if two conveyor belts are applied parallel to each other, their straight portions lead to a difference between the linear speed and the rotational speed between the parallel conveyor belts, which may cause opposite friction forces onto products to be transported by both belts.

In another known type of a helical conveyor straight portions at the input and the output of the helical path are minimized, caused by reverse rollers at the input and output which turn the conveyor belt upside down, whereas the conveyor belt is guided below the transport path such that the return path also follows a helical path, i.e the same path as the helical transport section but in opposite direction, as seen from above. This configuration is advantageous in terms of compactness, but requires a relatively long conveyor belt causing a relatively high friction rate.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

A conveyor herein described includes a return section having an upwardly directed return section portion which forms a connection between the upper return section portion and the lower return section portion and which extends at least partly outside the helical path as seen from above.

An advantage of the conveyor is that the return section of the conveyor belt has a relatively short length, whereas the conveyor belt is turned upside down at the upper end and the lower end of the transport section such that straight portions at the upper and lower ends can be minimized. This means that the transport section can approach a real helical path.

The upper and lower end reverse guides turn the conveyor belt upside down such that the conveyor belt moves in opposite direction before and after the upper and lower ends, respectively, as seen from above. The upper and lower end reverse guides may be rollers, possibly rollers including a drive for driving the conveyor belt. The term 'horizontally oriented' in the horizontally oriented upper and lower return section portions does not mean that these return section portions must extend exactly horizontally. They may be angled with respect to the horizontal plane, but in practice the angle may be smaller than 25°. For example, the upper return section portion may have approximately the same inclination as the inclination of the helical path. An increasing angle could lead to a reduced space between the upper windings of the helical path.

In a practical embodiment the upper end lies at an end of the helical path and the return section leaves the upper end tangentially as seen from above and/or the lower end lies at an end of the helical path and the return section leaves the lower end tangentially as seen from above. This means that the return section extends in outward direction from the helical path as seen from the upper end and/or lower end of the helical path. If the upper end lies at an end of the helical path and the lower and lies at an opposite end of the helical path, the conveyor belt follows an entirely helical path in the transport section. If the upper and lower end reverse guides comprise rollers, there will be short but minimal straight portions at the upper and lower ends of the helical path. An advantage of no or short straight portions in the transport section is that a typical rotation of products at a transfer between the helical path and straight path is avoided or minimized. Besides, due to less relative motion within the conveyor belt at such a transfer, wear is minimized.

As indicated hereinbefore, there may be very short straight portions at the lower and upper end of the transport section in order to provide the upper and lower end reverse guides, but the lengths thereof are minimal. In other words, the upper and lower end reverse guides are at least partly located within the circumference of the helical path as seen from above.

In a specific embodiment at least one of the upper return section portion, lower return section portion and upwardly directed return section portion bends within the plane of the conveyor belt. This provides the opportunity to have no or minimal twist of the conveyor belt in the return section.

For example, the upper and lower end reverse guides are located at opposite locations of the helical path as seen from above, and the upper and lower return section portions extend parallel to each other as seen from above, wherein the return section has a downwardly directed bend between the upper return section portion and the upwardly directed return section portion, on the one hand, and an upwardly directed bend between the lower return section portion and the upwardly directed return section portion, on the other hand, and wherein the upwardly directed return section portion forms an S-shaped path within the vertical plane. A consequence of this embodiment is that the conveyor belt must have an upper side and lower side which are both suitable for supporting and transporting articles, since its upper side and lower side alternatingly function as a transporting surface within the helical transport section under operating conditions.

The upwardly directed bend may form a right angle between the lower return section portion and the upwardly directed return section portion, whereas the downwardly directed bend may form a right angle between the upper return section portion and the upwardly directed return section portion, respectively.

In an alternative embodiment at least one of the upper return section portion, lower return section portion and the upwardly directed return section portion twists about a longitudinal axis of the conveyor belt. This provides the opportunity to use a conveyor belt which has only one transporting surface for supporting articles, since this embodiment allows the conveyor belt to always have the same orientation in the transport section.

For example, the upper and lower end reverse guides are located at opposite locations of the helical path as seen from above, and the upper and lower return section portions extend parallel to each other as seen from above, wherein the return section has a downwardly directed bend between the upper return section portion and the upwardly directed return section portion, on the one hand, and an upwardly directed bend between the lower return section portion and the upwardly directed return section portion, on the other hand, wherein the upwardly directed return section portion follows an S-shaped path and twists by an angle of substantially 180°. Hence, when the conveyor belt in the return section moves from the upper end to the lower end, it can bend downwardly at the end of the upper return section portion and follow the twisted and S-shaped upwardly directed return section portion towards the lower return section portion.

The upwardly directed bend may form a right angle between the lower return section portion and the upwardly directed return section portion, whereas the downwardly directed bend may form a right angle between the upper return section portion and the upwardly directed return section portion, respectively.

The radius of the downwardly directed bend between the upper return section portion and the upwardly directed return section portion may be larger than the radius of the upwardly directed bend between the lower return section portion and the upwardly directed return section portion. This allows to apply a conveyor belt which has a smaller minimum bending radius when it is bent about its lower side than when it is bent about its upper side, for example a slat belt of which the slats are movably coupled to a chain extending below the centres of the slats.

In another alternative embodiment the return section has an upwardly directed bend between the upper return section portion and the upwardly directed return section portion, on the one hand, and an upwardly directed bend between the lower return section portion and the upwardly directed return section portion, on the other hand, and the upwardly directed return section portion bends within the plane of the conveyor belt. This means that the conveyor belt bends upwardly at the end of the upper return section portion remote from the upper end as well as at the end of the lower return section portion remote from the lower end, wherein the upwardly directed return section portion bends within the plane of the conveyor belt. This avoids the necessity of a twisted portion in the return section, whereas the conveyor belt can still always have the same orientation in the helical transport section. Furthermore, it is not necessary to use a relatively large radius at the upwardly directed bend between the upper return section portion and the upwardly directed return section portion in case of applying a conveyor belt which has a smaller minimum bending radius when it is bent about its lower side than when it is bent about its upper side.

The upwardly directed return section portion may extend within a vertical plane and/or the upwardly directed return section portion may bend by an angle of 180°.

In a specific embodiment the upper and lower end reverse guides are located at opposite locations of the helical path as seen from above, and the upper and lower return section portions extend parallel to each other as seen from above.

One of the upwardly directed bends may form a right angle between the lower return section portion and the upwardly directed return section portion and/or the other one may form a right angle between the upper return section portion and the upwardly directed return section portion.

In a specific embodiment the upper end of the transport section lies at an upper end of the helical path and the lower end of the transport section lies at a lower end of the helical path, wherein the conveyor belt is a first conveyor belt and the conveyor comprises a second drivable endless conveyor belt which extends parallel to the first conveyor belt. In this embodiment the first and second conveyor belt can be driven at the same angular speed within the transport section such that products do not move with respect to the first and second conveyor belt in the helical path, since the transport section forms substantially entirely a helical path. In the return section there will be a speed difference between the first and second conveyor belt.

An aspect of the invention is also related to a conveying system comprising at least two helical conveyors of the types as described above, wherein the helical conveyors are stacked onto each other such that the upper end of one of the conveyors is connected to the lower end of the other one. This means that products can follow the transport section of one conveyor and successively the transport section of the other conveyor. This provides the opportunity to create a high helical conveying system, which has a long total helical transport path or approximately a long total helical path, comprising separate conveyor belts, whereas the horizontal shift between two stacked conveyors is minimized due too minimal straight portions at the lower and upper end of the respective transport sections.

BRIEF DESCRIPTION OF THE DRAWINGS

Aspects of the invention will hereafter be elucidated with reference to very schematic drawings showing embodiments of the invention by way of example.

DETAILED DESCRIPTION OF THE ILLUSTRATIVE EMBODIMENTS

FIGS. 1-4 show a first embodiment of a helical conveyor 1. The conveyor 1 has 4.5 windings about a central column 2 and comprises a drivable endless conveyor belt 3 in the form of a slat belt, which has a plurality of slats, each including a longitudinal direction which extends transversely to the conveying direction. The conveyor belt 3 is supported and guided by a frame which is not shown for explanatory reasons. The conveyor belt 3 is driven by a drive such as a motor which is not shown.

The slats of the conveyor belt 3 are movable with respect to each other such that the conveyor belt 3 can follow bends in a lateral direction within the plane of the conveyor belt 3 and in a direction perpendicularly to the plane of the conveyor belt 3. Each slat has an upper flat transport face and the slats are joined to each other so closely in the transport path that articles may be supported by a number of adjacent slats. The slats may be pivotally interconnected which allows to follow the path through the helical conveyor 1. The slats may be slightly tapered from their central axis to the ends, such that they do not interfere in curves.

The conveyor belt 3 comprises a transport section for transporting products, where the conveyor belt 3 follows a helical path. The transport section extends between a lower end 4 and an upper end 5 of the helical path. The conveyor 1 is provided with a lower end reverse guide in the form of a lower end reverse roller 6 at the lower end 4 and an upper end reverse guide in the form of an upper end reverse roller 7 at the upper end 5 of the helical path. In practice products may be placed onto the conveyor belt 3 at the lower end 4 of the helical path and follow the transport section upwardly to the upper end 5 of the helical path where they can leave the conveyor belt 3.

Figure 1:
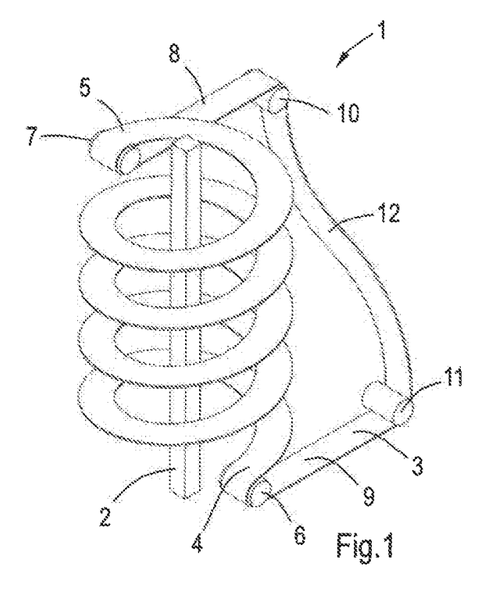
FIG. 1 is a perspective view of an embodiment of a helical conveyor.
Figure 2:
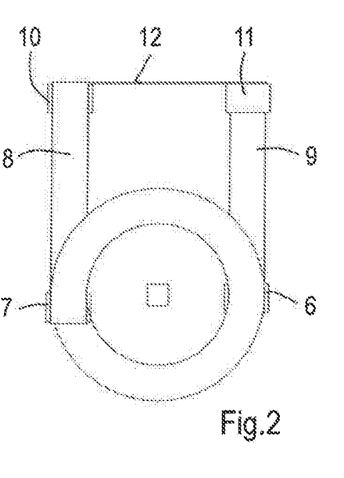
FIG. 2 is a plan view of the embodiment as shown in FIG. 1.
Figure 3:
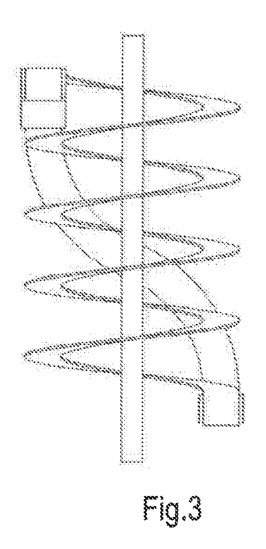
FIG. 3 is a side view of the embodiment as shown in FIG. 1.
Figure 4:
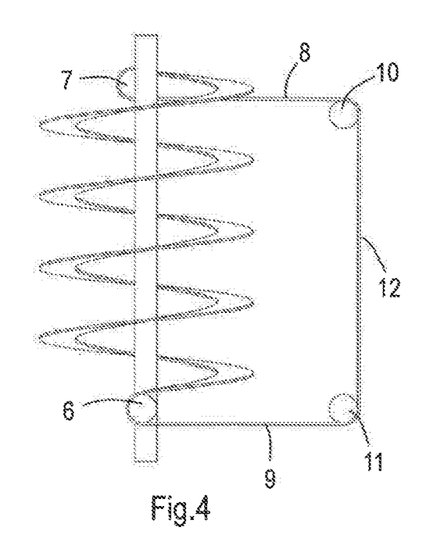
FIG. 4 is a similar view as FIG. 3, but seen from a different side.
Figure 5:
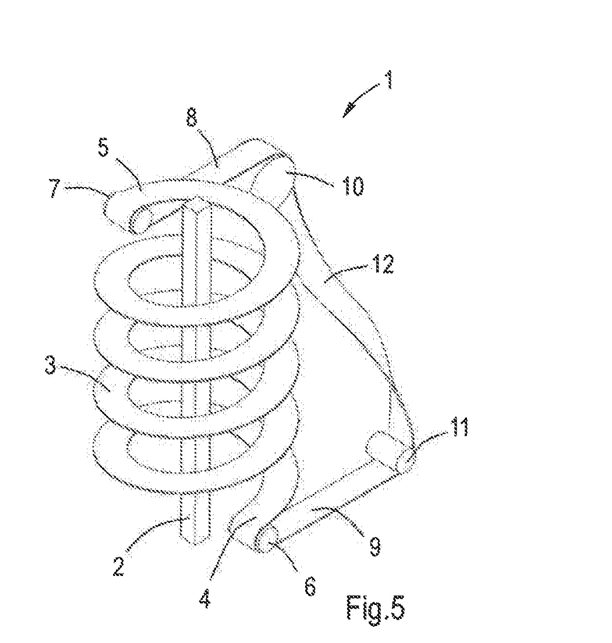
FIGS. 5-8 are similar views as FIGS. 1-4, respectively, but showing an alternative embodiment.
Figure 6:
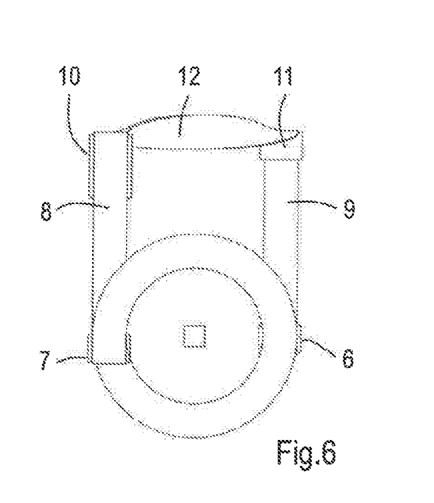

The conveyor belt 3 also comprises a return section which extends between the upper end 5 and the lower end 4 outside the helical path. The return section comprises a non-helical path. At the upper end 5 and the lower end 4 of the helical path the conveyor belt 3 is turned upside down by the upper end reverse roller 7 and the lower end reverse roller 6, respectively. Hence, an upper return section portion 8 leaving the helical path below the upper end 5 thereof and a lower return section portion 9 leaving the helical path below the lower end 4 thereof is created. In this case the upper return section portion 8 and the lower return section portion 9 are straight and parallel to each other, both as seen from above as shown in FIG. 2 as well as seen from one side as shown in FIG. 4 and they extend horizontally. FIG. 2 shows that the upper return section portion 8 and the lower return section portion 9 leave the upper end 5 and lower end 4 tangentially, respectively, as seen from above. The upper end reverse roller 7 and the lower end reverse roller 6 are located at opposite sides of the helical path as seen from above. Their centerlines may lie in or close to a plane which is at or close to the central column 2 as illustrated in FIG. 4, or their centerlines and the centerline of the central column 2 may substantially lie in the same plane. Their centerlines may be closer to a vertical plane when the dimensions of the rollers 6, 7 become smaller with respect to the radius of the helical path.

In the embodiment as shown in FIGS. 1-4 the return section is provided with an upper guide roller 10 and a lower guide roller 11 which are located at the ends of the upper return section portion 8 and the lower return section portion 9, respectively. In this case the upper and lower guide rollers 10, 11 have the same diameter and their centerlines lie in a common vertical plane. Consequently the return section has a right angle between the upper return section portion 8 and an upwardly directed return section portion 12, on the one hand, and a right angle between the lower return section portion 9 and the upwardly directed return section portion 12, on the other hand. The upwardly directed return section portion 12 lies below the upper return section portion 8 and above the lower return section portion 9. The upwardly directed return section portion 12 extends in a vertical plane and follows an S-shaped path within the vertical plane, see FIG. 3. This means that the upwardly directed return section portion 12 of the conveyor belt 3 only bends within the plane of the conveyor belt 3 without any or any significant twist. The end portions of the S-shaped upwardly directed return section portion 12 are parallel to each other.

The conveyor belt 3 of the embodiment as shown in FIGS. 1-4 has an upper side and lower side which are both suitable for supporting and transporting articles, since its upper side and lower side alternatingly function as a transporting surface. In other words, the conveyor belt 3 follows the helical path upside down after each next cycle. This means that the conveyor belt 3 must be able to bend perpendicularly with respect to the plane of the conveyor belt 3 in opposite directions in a similar way. The slats can be movably coupled to each other such that they are able to pull each other through the conveyor, for example a modular plastic belt. It may be clear that in this embodiment the slats cannot be mounted to a chain which extends at the centers of the slats below the slats, for example.

FIGS. 5-8 show a second embodiment of a helical conveyor 1. The second embodiment has a lot of similarities to the first embodiment and reference signs of corresponding parts are the same. The return section also follows a non-helical path and is guided by the upper guide roller 10 and the lower guide roller 11. However, the radius of the upper guide roller 10 is larger than the radius of the lower guide roller 11, the radius of the lower end reverse roller 6 and the radius of the upper end reverse roller 7, whereas the upwardly directed return section portion 12 is twisted by 180° about a longitudinal axis of the conveyor belt 3. The upwardly directed return section portion 12 lies below the upper return section portion 8 and above the lower return section portion 9.

Figure 7:
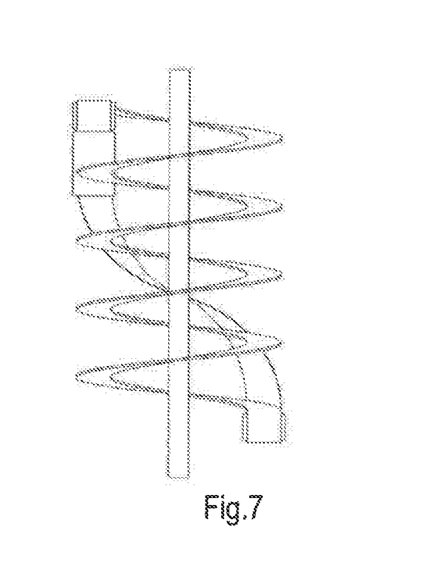
Figure 8:
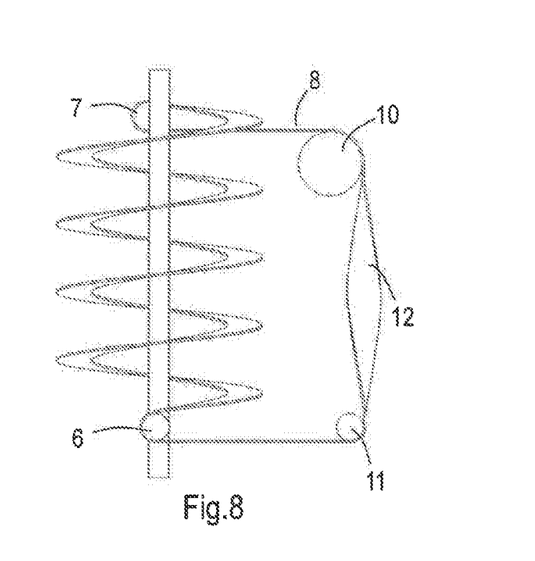

FIG. 7 illustrates that the upwardly directed return section portion 12 also has an S-shape as seen from one side. The end portions of the S-shaped upwardly directed return section portion 12 are parallel to each other; in this case they lie in the same vertical plane, see FIG. 8. It is noted that the upper side or the transporting surface of the conveyor belt 3 is directed upwardly in the helical transport section, directed downwardly in the upper return section portion 8, directed inwardly to the central column 2 of the helical path in the upper part of the upwardly directed return section portion 12, directed outwardly away from the helical path in the lower part of the upwardly directed return section portion 12, and directed downwardly in the lower return section portion 9. Due to the configuration of the embodiment as shown in FIGS. 5-8 the upper side or the transporting surface of the conveyor belt 3 is always directed upwardly in the helical path.

The diameter of the upper guide roller 10 is relatively large since the conveyor belt 3 as used in this embodiment has a smaller minimum bending radius when it is bent about its lower side than when it is bent about its upper side. This is typically the case when the lower sides of the slats of the conveyor belt 3 are mounted to a chain which is guided through a rail. Although FIGS. 5-8 shows the upper guide roller 10 as being a roller, it is also possible that the conveyor belt 3 is only guided at its lower side through the right angle between the upper return section portion 8 and the upwardly directed return section portion 12 such that the upper guide roller 10 can be omitted.

FIGS. 9-12 show a third embodiment of a helical conveyor 1. The third embodiment has a lot of similarities to the first and second embodiments and reference signs of corresponding parts are the same. The return section also follows a non-helical path and is guided by the upper guide roller 10 and the lower guide roller 11. Contrary to the second embodiment the upwardly directed return section portion 12 is not twisted, but extends in a vertical plane. Furthermore, the diameter of the upper guide roller 10 is relatively small and in this case the same as the lower guide roller 11. This is possible with this configuration, in spite of the fact that the conveyor belt 3 of the third embodiment has also a smaller minimum bending radius when it is bent about its lower side than when it is bent about its upper side. Since the conveyor belt 3 first bends upwardly at the end of the upper return section portion 8 as seen from the upper end 5, the upper side or transporting surface of the conveyor belt 3 is directed away from the upper guide roller 10. Consequently, compared to the second embodiment, the third embodiment provides the possibility to make a compact conveyor 1 in horizontal direction.

Figure 9:
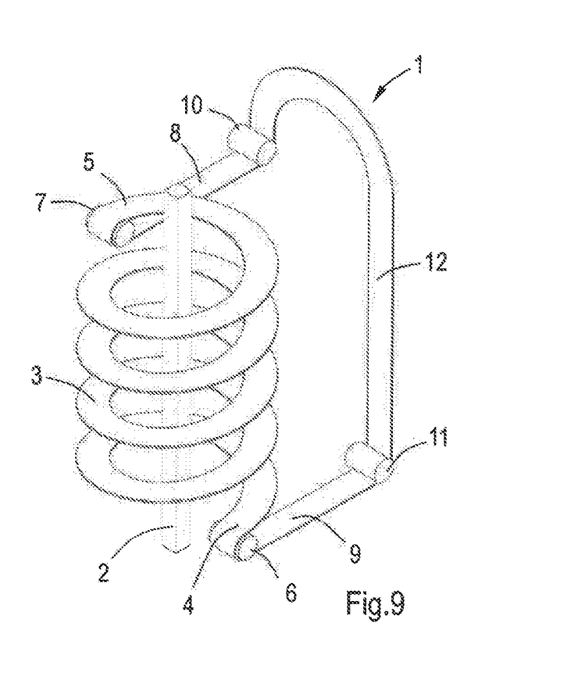
FIGS. 9-12 are similar views as FIGS. 1-4, respectively, but showing another alternative embodiment.
Figure 10:
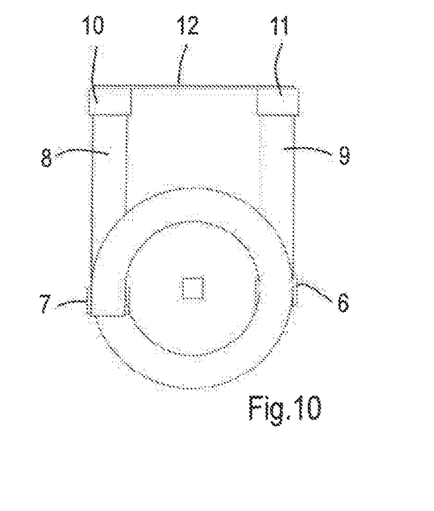
Figure 11:
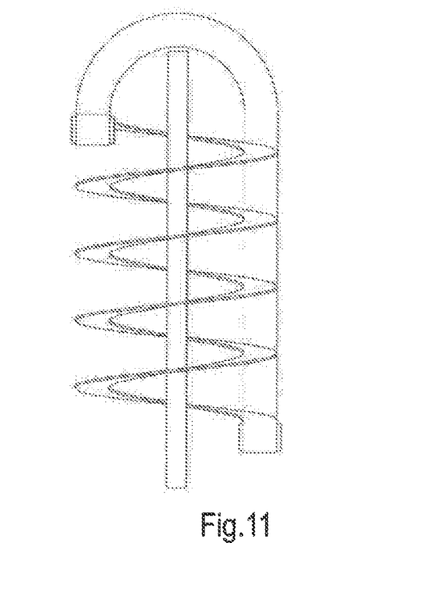
Figure 12:
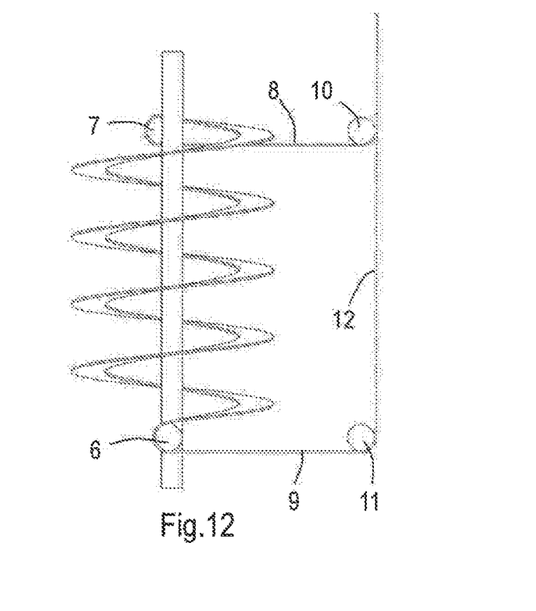

As shown in FIG. 9 the conveyor belt 3 is bent upwardly by the upper guide roller 10, at the end of the upper return section portion 8 remote from the upper end 5 of the helical path. Similarly, the conveyor belt is also bent upwardly by the lower guide roller 11. The centereelines of the upper and lower guide rollers 10, 11 lie in a vertical plane. Consequently, the upwardly directed return section portion 12 also lies in a vertical plane and bends within the plane of the conveyor belt 3 by an angle of 180°.

An advantage of the embodiments as shown in FIGS. 1-12 is that the lower end reverse roller 6 and the upper end reverse roller 7 turn the conveyor belt upside down at the lower end 4 and the upper end 7 such that a real or almost real helical transport section is obtained including minimum straight portions at the lower and upper end 4, 5 thereof, whereas the return section is a non-helical, relatively short track. This minimizes required driving force. Another advantage is that the conveyors 1 can be stacked on each other and coupled to each other such that a high total helical path is obtained. This is illustrated in FIG. 13 with three conveyors 1 of the type of the third embodiment according to FIGS. 9-12.

Figure 13:
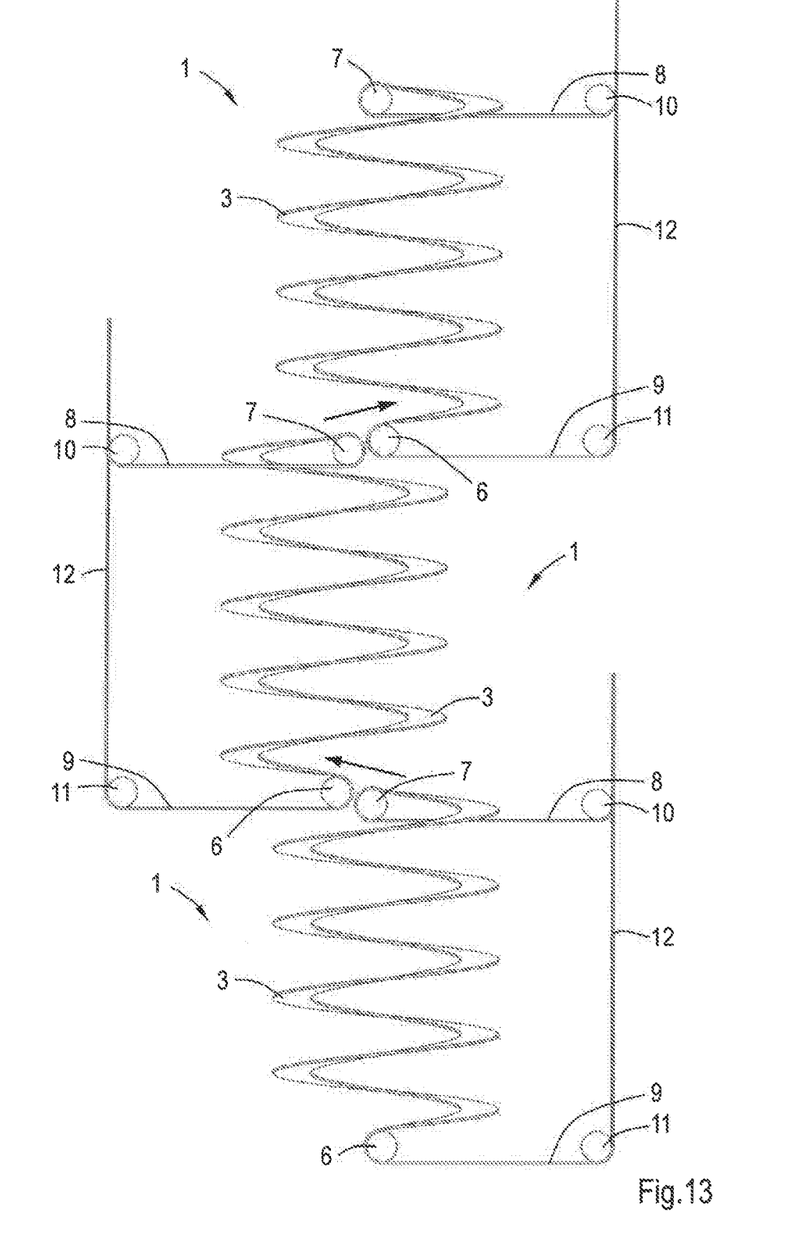
FIG. 13 is a similar view as FIG. 12, showing a stacked configuration.
Figure 14:
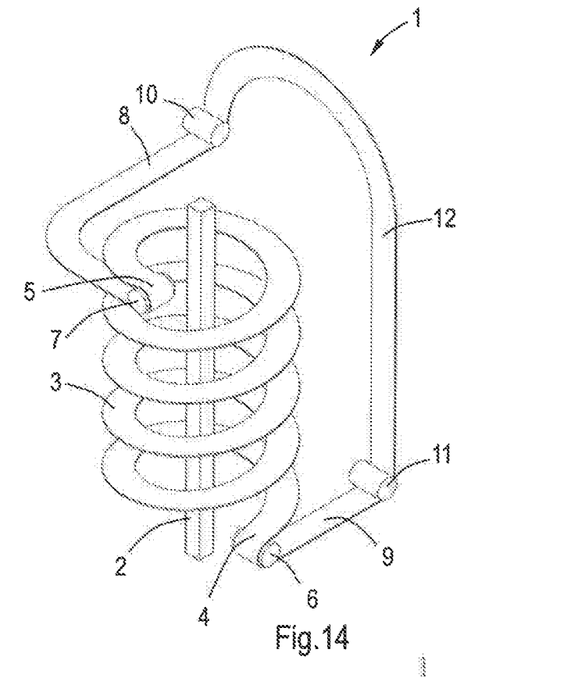
FIGS. 14-17 are similar views as FIGS. 1-4, respectively, but showing another alternative embodiment.
Figure 15:
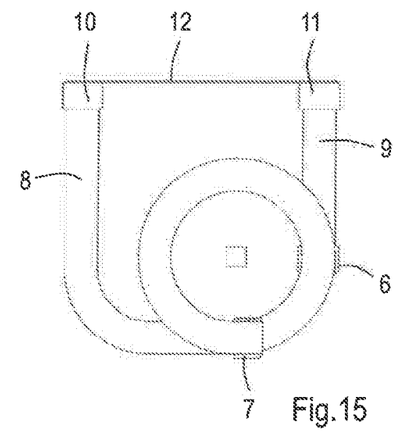
Figure 16:
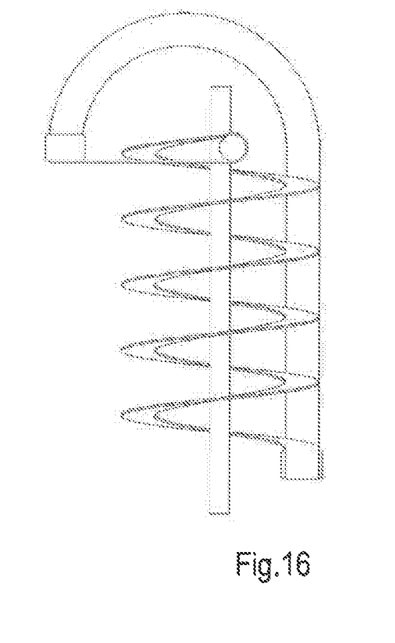
Figure 17:
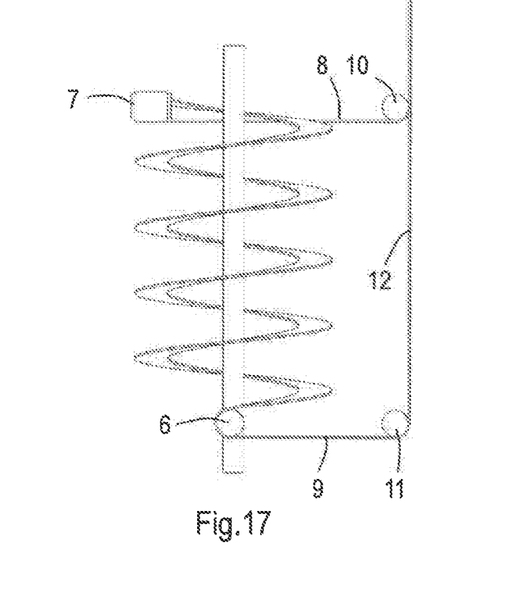
Figure 18:
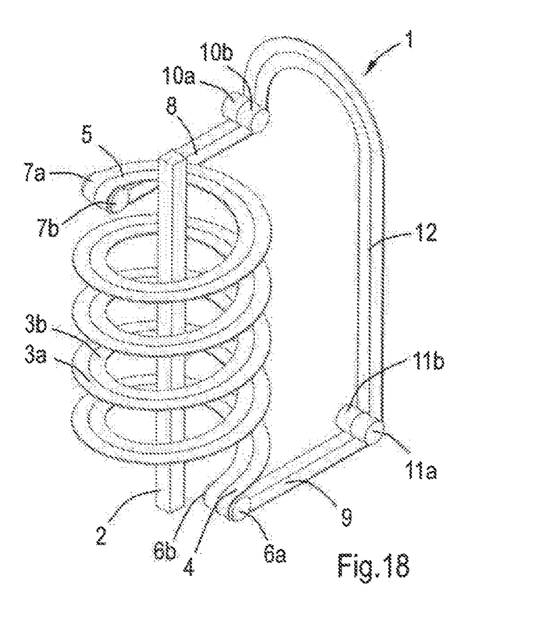
FIGS. 18-21 are similar views as FIGS. 1-4, respectively, but showing still another alternative embodiment.
Figure 19:
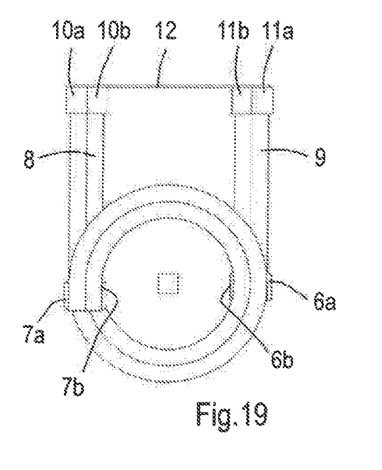
Figure 20:
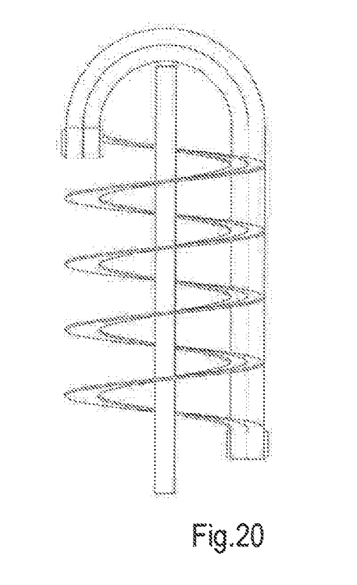
Figure 21:
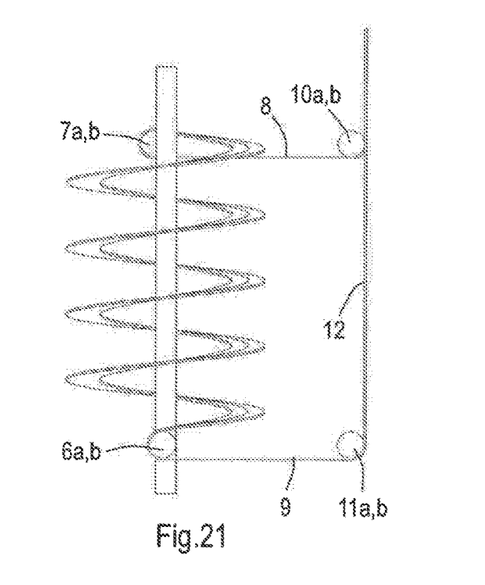

FIG. 13 shows that the centerline of the middle conveyor 1 has a little horizontal displacement with respect to the upper and lower conveyor 1. However, the horizontal displacement will be reduced in case of upper and lower end reverse rollers 6, 7 which have a relatively small diameter with respect to the diameter of the helical path. The transition between the upper end 5 of one conveyor 1 and the lower end 4 of another conveyor 1 may have a wedge-shaped opening, as seen from above, which can be bridged by a guide plate or the like.

FIGS. 14-17 show an alternative embodiment of the third embodiment. In this case the conveyor 1 has 4.75 windings about the central column 2. The upper return section portion 8 has a horizontal bend between the upper end 5 and the upper guide roller 10. FIGS. 14-17 illustrate that numerous variations of the embodiments as described and shown herein are conceivable.

FIGS. 18-21 show still another alternative embodiment of the third embodiment. In this case the conveyor 1 has two parallel conveyor belts 3a, 3b, which are driven at different linear speeds such that their angular speeds within the helical path are substantially equal. Consequently, products supported by both belts 3a, 3b do not move with respect to the first and second conveyor belt 3a, 3b in the helical path, since the belts more or less form a single wide conveyor belt. This is possible since the transport section forms substantially entirely a helical path with very short or without straight portions. In FIGS. 18-21 the conveyor belt which follows the outer curve in the helical path is indicated by 3a and the other one is indicated by 3b. The other components of the conveyor are indicated by corresponding reference signs ending by a or b.

The invention is not limited to the embodiments shown in the drawings and described hereinbefore, which may be varied in different manners within the scope of the claims and their technical equivalents. For example, it is conceivable that the conveyor belt is twisted in the upper or lower return section portion rather than the upwardly directed return section portion. Furthermore, the transport section may have straight portions between the upper end thereof and the helical path and/or between the lower end thereof and the helical path. This means that the transport section is not entirely a helical path.

What is claimed is:

1. A helical conveyor, comprising a drivable endless conveyor belt having a transport section for transporting products where the conveyor belt follows at least partly a helical path between a lower end and an upper end of the transport section and a return section where the conveyor belt follows a path between the lower end and the upper end outside the transport section, a lower end reverse guide for turning the conveyor belt upside down and reverting its direction of movement between the transport section and the return section at the lower end of the transport section and an upper end reverse guide for turning the conveyor belt upside down and reverting its direction of movement between the transport section and the return section at the upper end of the transport section, wherein the return section leaves the upper end through a horizontally oriented upper return section portion that extends away from the helical path from below a portion of an upper winding of the helical path, and the return section leaves the lower end through a horizontally oriented lower return section portion, wherein the lower return section portion extends from the lower end below a lower winding of the helical path and leaves the outer circumference of the helical path as seen from above towards an upwardly directed return section portion of the return section, and wherein the upwardly directed return section portion forms a connection between the upper return section portion and the lower return section portion and extends at least partly outside the helical path as seen from above.

2. The helical conveyor according to claim 1, wherein the upper end lies at an end of the helical path and the return section leaves the upper end tangentially as seen from above and/or the lower end lies at an end of the helical path and the return section leaves the lower end tangentially as seen from above.

3. The helical conveyor according to claim 1, wherein at least one of the upper return section portion, lower return section portion and upwardly directed return section portion bends within a plane of the conveyor belt.

4. The helical conveyor according to claim 3, wherein the upper and lower end reverse guides are located at opposite locations of the helical path as seen from above, and wherein the upper and lower return section portions extend parallel to each other as seen from above, wherein the return section has a downwardly directed bend between the upper return section portion and the upwardly directed return section portion, on the one hand, and an upwardly directed bend between the lower return section portion and the upwardly directed return section portion, on the other hand, wherein the upwardly directed return section portion forms an S-shaped path within a vertical plane.

5. The helical conveyor according to claim 1, wherein at least one of the upper return section portion, lower return section portion and upwardly directed return section portion twists about a longitudinal axis of the conveyor belt.

6. The helical conveyor according to claim 5, wherein the upper and lower end reverse guides are located at opposite locations of the helical path as seen from above, and wherein the upper and lower return section portions extend parallel to each other as seen from above, wherein the return section has a downwardly directed bend between the upper return section portion and the upwardly directed return section portion, on the one hand, and an upwardly directed bend between the lower return section portion and the upwardly directed return section portion, on the other hand, wherein the upwardly directed return section portion follows an S-shaped path and twists by an angle of substantially 180°.

7. The helical conveyor according to claim 6, wherein a radius of the downwardly directed bend is larger than a radius of the upwardly directed bend.

8. The helical conveyor according to claim 1, wherein the return section has an upwardly directed bend between the upper return section portion and the upwardly directed return section portion, on the one hand, and an upwardly directed bend between the lower return section portion and the upwardly directed return section portion, on the other hand, and wherein the upwardly directed return section portion bends within a plane of the conveyor belt.

9. The helical conveyor according to claim 8, wherein the upwardly directed return section portion extends within a vertical plane.

10. The helical conveyor according to claim 8, wherein the upwardly directed return section portion bends by an angle of 180°.

11. The helical conveyor according to claim 8, wherein the upper and lower end reverse guides are located at opposite locations of the helical path as seen from above, and wherein the upper and lower return section portions extend parallel to each other as seen from above.

12. The helical conveyor according to one of the claim 4, wherein the upwardly directed bend forms a right angle between the lower return section portion and the upwardly directed return section portion and/or between the upper return section portion and the upwardly directed return section portion and/or the downwardly directed bend forms a right angle between the upper return section portion and the upwardly directed return section portion.

13. The helical conveyor according to claim 1, wherein the upper end of the transport section lies at an upper end of the helical path and the lower end of the transport section lies at a lower end of the helical path, wherein the conveyor belt is a first conveyor belt and the helical conveyor comprises a second drivable endless conveyor belt which extends parallel to the first conveyor belt.

14. A conveying system comprising at least two helical conveyors according to claim 1, wherein the helical conveyors are stacked onto each other such that the upper end of one of the conveyors is connected to the lower end of the other one.

* * * * *